Figure 1:
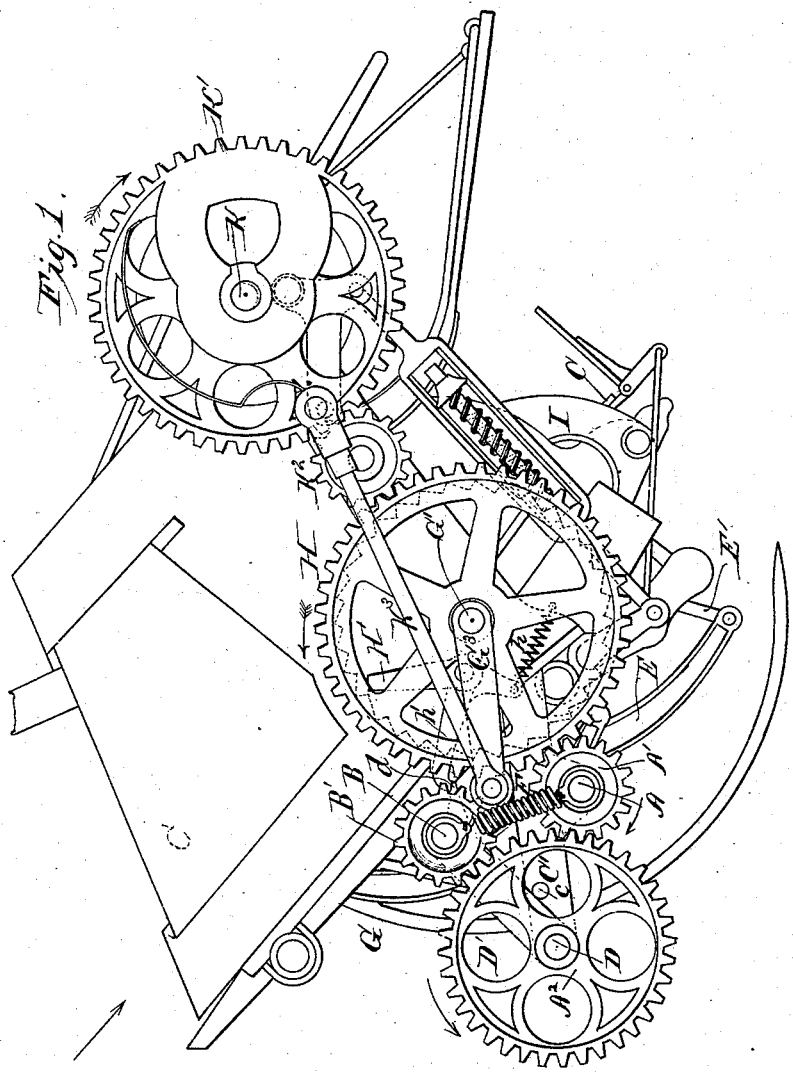

(No Model.)  5 Sheets—Sheet 1.

P. F. HODGES.
GRAIN BINDER.

No. 315,289.  Patented Apr. 7, 1885.

Witnesses:
E. J. Walker
W. A. Jones

Inventor:
Perry F. Hodges
by his attorney (No Model.)   P. F. HODGES.   5 Sheets—Sheet 2.

GRAIN BINDER.

No. 315,289.   Patented Apr. 7, 1885.

(No Model.)  P. F. HODGES.  5 Sheets—Sheet 5.
GRAIN BINDER.

No. 315,289. Patented Apr. 7, 1885.

Witnesses:
Inventor:

UNITED STATES PATENT OFFICE.

PLINY F. HODGES, OF CHICAGO, ILLINOIS.

GRAIN-BINDER.

SPECIFICATION forming part of Letters Patent No. 315,289, dated April 7, 1885.

Application filed September 22, 1883. (No model.)

*To all whom it may concern:*

Be it known that I, PLINY F. HODGES, a citizen of the United States, residing at Chicago, in the county of Cook and State of Illinois, have invented certain new and useful Improvements in Grain-Binders; and I do hereby declare the following to be a full, clear, and exact description of the invention, such as will enable others skilled in the art to which it appertains to make and use the same.

This invention relates to that style of grain-binders the binding mechanism of which is normally at rest, but is periodically driven by a clutch, which is automatically thrown in gear with the main drive-wheel of the binding mechanism each time a bundle or sheaf of grain of predetermined size has been formed by packers, and is again automatically thrown out of gear as soon as the sheaf has been bound and ejected. Various means have heretofore been employed for controlling said clutch. In some machines it is controlled by a compressor arm, strap, or foot, against which the grain is packed, and which, when the bundle or sheaf has attained the desired size and compactness, yields, and in yielding either throws the clutch in gear or simply trips it in case the clutch is a self-engaging one. In other machines the clutch is controlled by yielding packers, which in yielding turn back on their shaft or cranks and cause the clutch to be thrown or tripped. In still other machines the clutch is controlled by the packers through the intervention of a sliding and spring-actuated supplemental clutch on the packer-shaft, which supplemental clutch normally engages a constantly-running loose main drive-wheel, which latter pushes the supplemental clutch temporarily out of engagement, and thereby causes the main clutch to be thrown or tripped each time a sheaf of required size has been packed.

My invention relates more particularly to that still different style of machines in which the clutch is controlled by a yielding packer-shaft; and my improvement consists, first, in mounting the packer-shaft in bracket-arms of a rock-shaft and driving said packer-shaft from a wheel loose on the rock-shaft; secondly, in superadding a mechanism whereby the packer-shaft is moved farther in the direction in which it yields in order to temporarily throw the packers out of operative position.

In order that my invention may be clearly understood, I have illustrated it by two examples—namely, by one showing the above-recited first part of it, in which the packer-shaft is arranged beneath or behind the binder-table, and by another showing the whole of it, in which the packer-shaft is arranged above or in front of the binder-table. The first-mentioned example of my invention is illustrated on Sheets 1 and 2 of the drawings, where—

Figure 2:
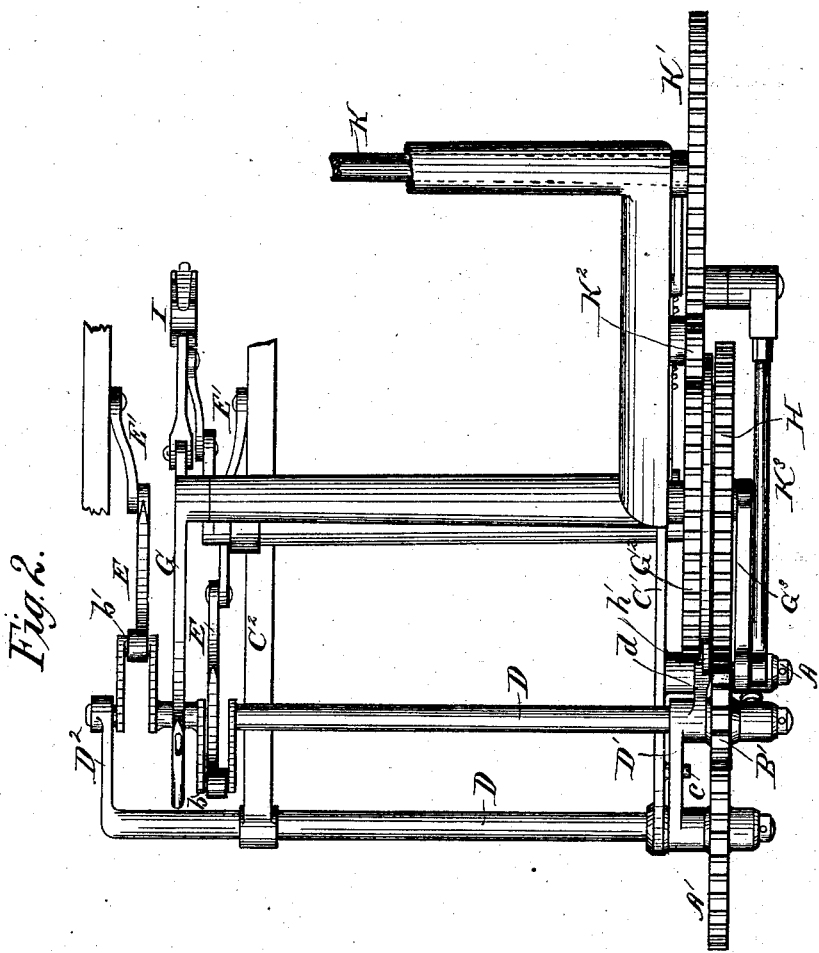

Figure 1 is an end elevation of a grain-binder for harvesters embodying my invention; and Fig. 2 is a plan view thereof, some parts omitted or broken away to avoid complicating the drawings unnecessarily.

The grain-binder illustrated in these figures is one in most respects like that shown and described in the United States Patent of J. F. Appleby, No. 264,602, which may be examined for information about the construction and operation of parts corresponding to such as are illustrated in my drawings, but not specifically described hereinafter.

A' refers to the constantly-running main drive-wheel, which is mounted on a shaft, A, supported on the main frame of the binder, and from which all the movements of the packing and binding and ejecting devices are derived. B refers to the packer-shaft, which is located under the sloping binder-table C, and carries a fast spur-wheel, B', which is driven by the wheel A', through the intervention of an idle-wheel, $A^2$, loosely mounted on one end of a rock-shaft, D. The packer-shaft is journaled in the bracket-arms D' and $D^2$, formed on or fixed to the rock-shaft D, and is constructed with the ordinary double cranks, $b$ and $b'$, for operating the packers E E, pivoted to said cranks, and also connected by links E' E' to fixed studs on the frame of the binder in the usual way. The packers accumulate and pack the grain into a bundle against the compressor-foot I. Rock-shaft D is journaled in rigid bracket-arms C' $C^2$, secured to the main frame. The packer-shaft is connected by a spring, F, to a fixed part of the binder in such a manner that the tension of the spring will tend to hold the arm D' of the rock-shaft forcibly against a stop, $c$, on bracket-arm C', and thus maintain the packer-shaft in its normal position. I have shown a simple spiral spring connected at one end to a loose ring on the main shaft A, and at the other end to a similar loose ring on the packer-shaft; but in practice the spring may be combined with means for adjusting its tension, as shown, for instance, in the second example of my invention; and it may be attached to some part of the binder other than the main shaft thereof. The binding-arm G is secured to one end of a shaft, G', which is driven at intervals by the main drive-wheel A', through the intervention of a suitable clutch. The driving part of the clutch illustrated consists of a spur-wheel, H, which is mounted to turn loosely on shaft G', and is constructed with an internal ring of ratchet-teeth, as indicated by dotted lines in Fig. 1. It is constantly driven by the main drive-wheel A'. The driven part of the clutch illustrated is a pawl, H', which is pivoted to a spur-wheel, $G^2$, loosely mounted on shaft G' close up to wheel H, so that the pawl may be in line with the internal ratchet-teeth of the latter. Wheel $G^2$ drives through idle-wheel $K^2$ the wheel K' on the shaft K, which operates the knot-tying and bundle-ejecting devices. A crank-pin on wheel K' is connected by a connecting-rod, $K^3$, to a crank, $G^3$, fixed on the outer end of shaft G', so that the binding-arm will be once projected and retracted during the rotation of wheel K'. As long as the packer-shaft retains its normal position, (that shown in Fig. 1,) the pawl H' is held out of gear by a projection or toe, d, on the supporting-arm D' of said shaft, which toe acts as a stop to a finger, h', formed on the pawl, and causes the pawl to be turned back on its pivot, so as to become disengaged from the ratchet-teeth of wheel H; but when the packer-shaft recedes or yields, in consequence of the resistance offered to the packers by the increasing size and compactness of the sheaf packed against the compressor-foot I, and the toe d escapes from under the finger h', the pawl is immediately thrown in gear with the ratchet-teeth of wheel H by the action of a spring, h, and the binder put in motion. The sheaf is bound and ejected during one rotation of wheel $G^2$, and the packer-shaft resumes its normal position in time to place the toe d again in the path of finger h', so that the pawl will be forced out of gear as the wheel $G^2$ completes its rotation.

It will be observed that the packer-shaft swings on an axis coincident with the axis of idle-wheel $A^2$, so that its wheel B' is always in gear with said idle-wheel.

Figure 3:
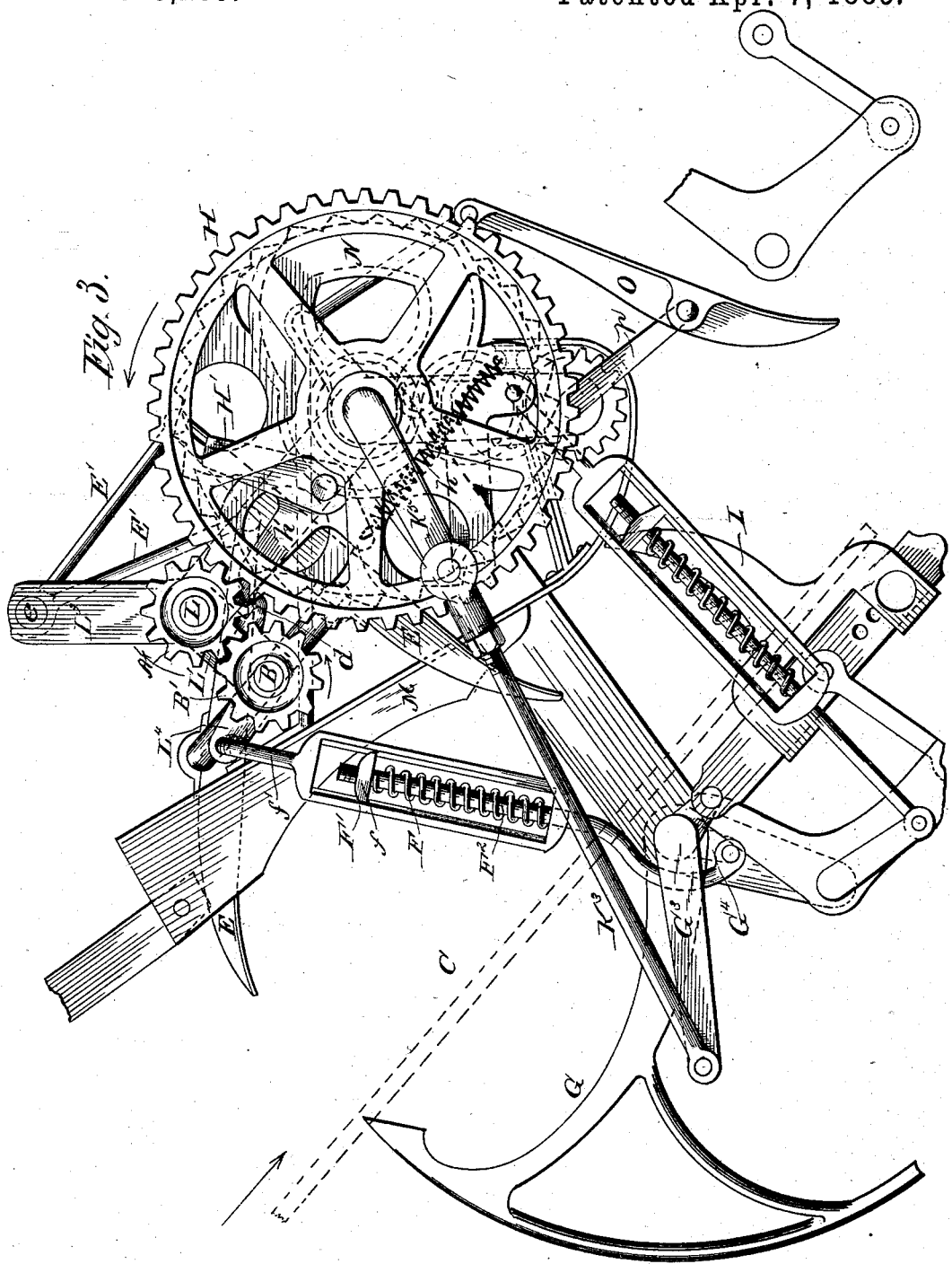
Figure 4:
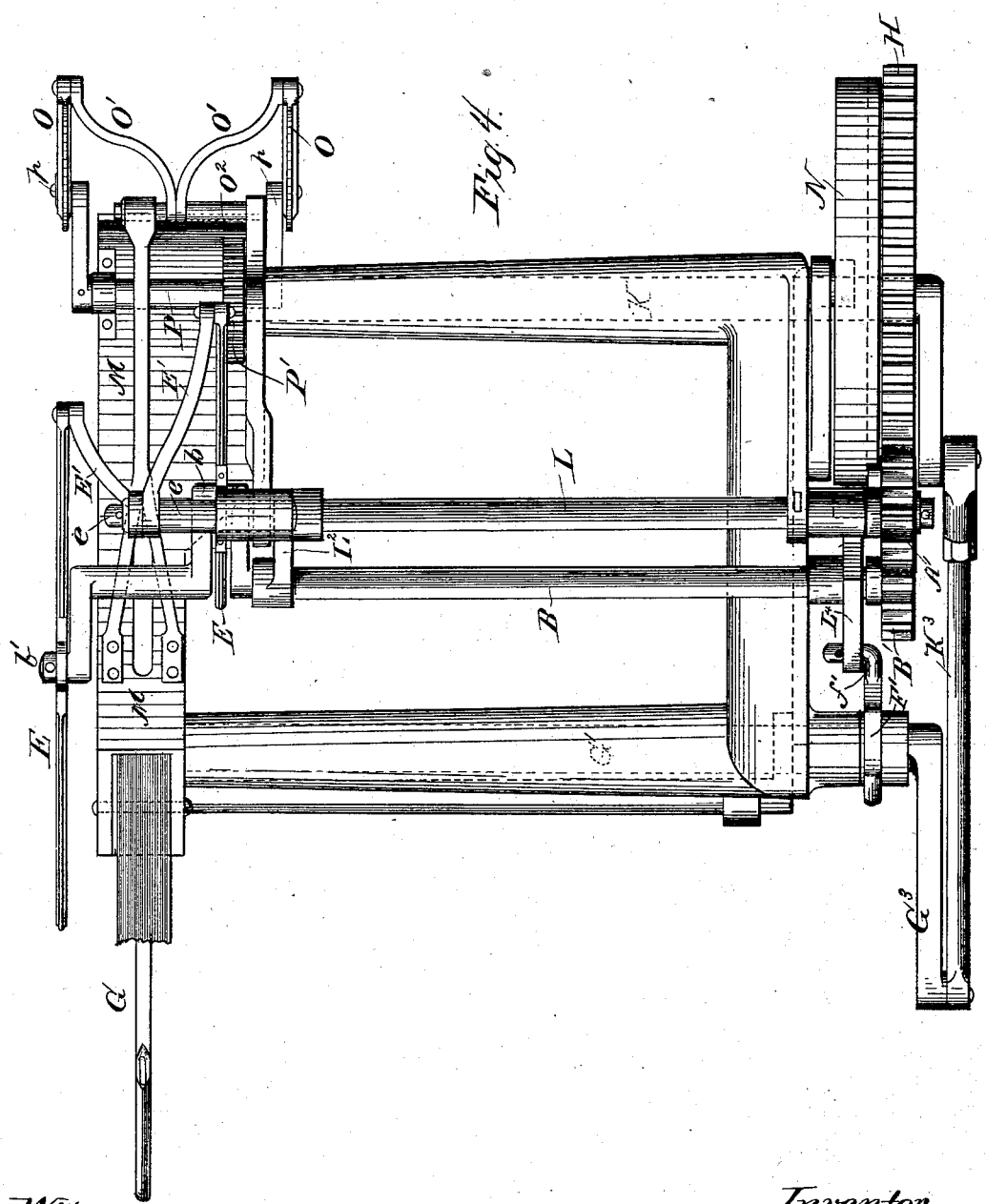
Figure 5:
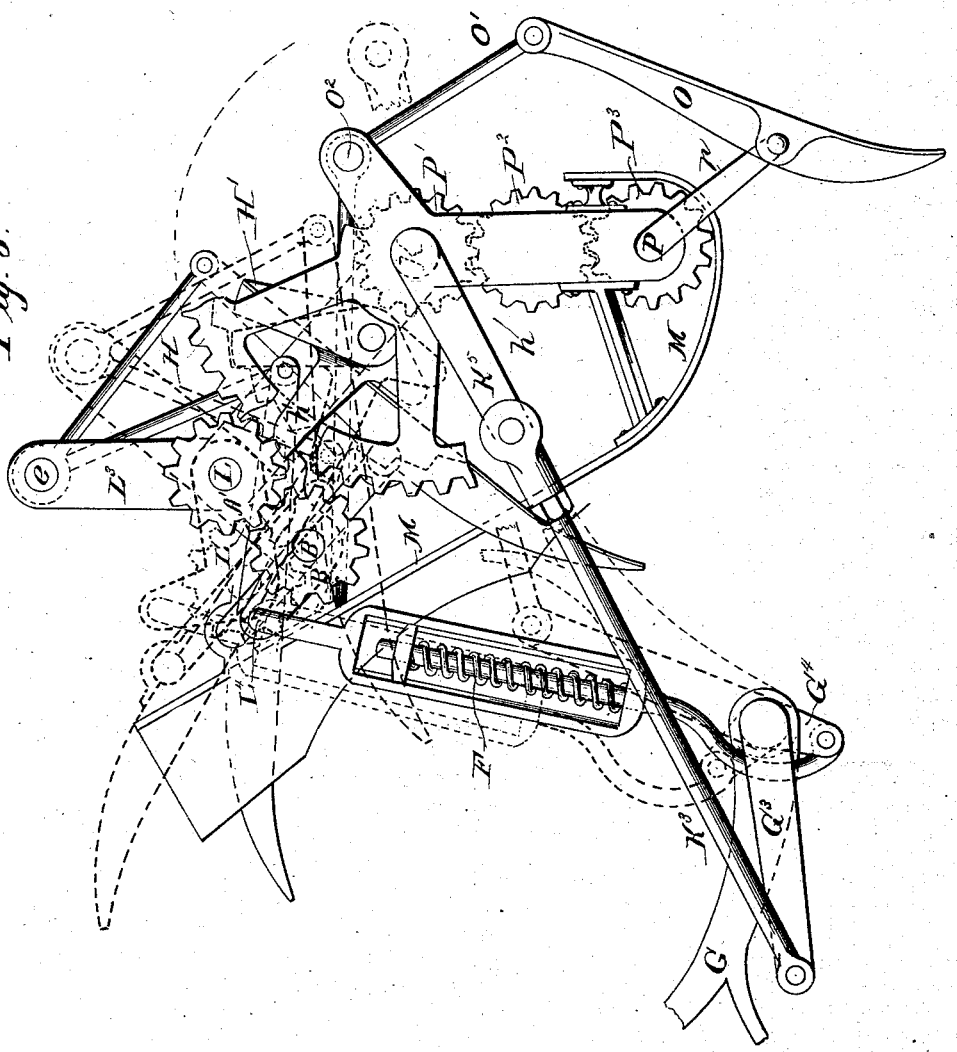

The second example of my invention is illustrated on Sheets 3, 4, and 5 of the drawings, where Fig. 3 is an end elevation of so much of a grain-binder for harvesters as will clearly show the application of my invention. Fig. 4 is a plan view of the same. Fig. 5 is also an end view thereof, some parts shown in Fig. 3 being omitted or partly broken away.

The grain-binder illustrated in these figures is also in many respects like what is known as the "Appleby binder," and the construction, operation, and purpose of parts shown in the drawings, but not specifically referred to hereinafter, will be readily understood by those skilled in the art, who can likewise supply parts omitted.

All the devices shown on Sheets 3, 4, and 5 of the drawings which correspond to like devices shown on Sheets 1 and 2 and lettered, are designated by the same letters of reference used there.

The constantly-running main drive-wheel A' is mounted to turn loosely on a rock-shaft, L, supported in bracket-arms of the main frame above the breastplate M, which is suspended over or in front of the sloping binder-table C. The packer-shaft B, also above said breastplate, is supported in bearings on arms L' and $L^2$, formed on or secured to shaft L, and its cranks b and b' are so located that the packers E E operate on opposite sides of the breastplate M. The tails of the packers are connected by the links E' E' to a stud, e, supported in the upper end of an arm, $L^3$, which may be a branch of arm $L^2$, or a separate arm fixed to shaft L. Normally, the packer-shaft and stud e occupy the position shown in Fig. 3, and are held in that position by the spiral spring F, one or the other of the arms of the rock-shaft L resting against a suitable stop on the framework. The spring F is arranged in the frame F' of a buckle and encircles a screw-threaded rod, $F^2$, between a nut, f, thereon and the lower cross-bar of the buckle-frame. The upper cross-bar of the buckle-frame is constructed with a shank, f', which is pivoted to a branch, $L^4$, on arm L' of rock-shaft L. The rod $F^2$ extends through the lower cross-bar of the buckle, and is at its lower end pivoted to an arm, $G^4$, on the shaft G' of the binding-arm G. The nut f is interlocked with ribs on the buckle, so that while it may slide therein it cannot turn. The spring F can be adjusted to the proper tension by shifting the nut f on its rod, which may be effected by temporarily disconnecting the rod $F^2$ from arm $G^2$ and screwing it through the nut in one direction or the other, according as the spring is to be contracted or relaxed. The main drive-wheel A' constantly drives the wheel H, the internal ring of ratchet-teeth of which constitute the driving part of the clutch for periodically driving the binding mechanism. The wheel H is mounted to turn loosely on the shaft K, which operates the knot-tying devices. The pawl H', which is the driven part of the clutch, is pivoted to a wheel or disk, N, mounted to turn loosely on shaft K, in close proximity to wheel H. The projection or toe d is formed on arm L' of rock-shaft L, and serves, as before, to stop the finger h' of pawl H', and cause the latter to be turned back on its pivot, and thereby to be disengaged from the internal ratchet-teeth of wheel H. The disk N takes the place of wheel K' of the binder shown in Figs. 1 and 2, and has the proper cam-groove formed in the face remote from wheel H, as indicated in dotted lines in Fig. 3, for operating the compressor-foot and flaps of the binder-table in ejecting a bound sheaf. The end of shaft K projecting beyond the hub of wheel H is provided with a crank-arm, $K^5$, the wrist-pin of which is connected by the connecting-rod $K^3$ to the crank $G^3$ on the shaft of the binding-arm.

It will be observed that the clutch is controlled by the yielding packer-shaft, substantially in the same manner as in the binder illustrated in Figs. 1 and 2; but the packer-shaft, after it has yielded to the accumulated sheaf and tripped the clutch, is moved or turned up farther by the lifting action of arm $G^4$ of the shaft of the binding-arm on the spring-buckle which connects said arm $G^4$ to one of the supporting-arms of the packer-shaft. The packer-shaft is lifted to about the position indicated in dotted lines in Fig. 5, the shaft L being rocked in consequence thereof, so as to turn arm $L^3$ thereof into the position shown also in dotted lines in said figure. The effect of all this is to throw the packers out of operative position. As the binding-arm returns to its position of rest the packer-shaft and rock-shaft L are also returned, and in consequence of a little lost motion in the spring-buckle reach their normal positions a little before the binding mechanism must be stopped, so that the toe $d$ will be in position in time to stop the progress of finger $h'$ of pawl H' and cause said pawl to be thrown out of gear.

For ejecting the bound sheaf from this binder I provide discharging-arms O O, pivoted to and operated by cranks $p\,p$ on a shaft, P, which is journaled in bearing on the breastplate M, and is driven from shaft K by a train of spur-wheels, $P'\ P^2\ P^3$. The shanks of the discharging-arms are connected by links O' O' to a pin, $O^2$, supported in fixed arms of the frame-work of the binder. These discharging-arms I do not claim in the patent.

My invention may be applied to other styles of grain-binders, as a matter of course.

Any desired or expedient form of clutch may be used instead of the one which I have described, and the packer-shaft may be supported in sliding bearings instead of in swinging ones, suitable changes being made in other details to meet the altered conditions.

I claim as my invention—

1. The combination, substantially as before set forth, of the packer-shaft, the rock-shaft, in bracket-arms of which the packer-shaft is supported, and the loose wheel on the rock-shaft for driving the wheel fixed to the packer-shaft.

2. The combination, substantially as before set forth, of the binding mechanism, a clutch adapted to drive it, and a packer-shaft adapted to yield to the accumulated sheaf, so as to trip or throw the said clutch, and mechanism whereby the packer-shaft is then moved farther in the direction in which it yielded, so as to throw the packers out of operative position.

In testimony whereof I affix my signature in presence of two witnesses.

PLINY F. HODGES.

Witnesses:
C. A. NEALE,
E. T. WALKER.